US012090636B2

(12) United States Patent
Seki

(10) Patent No.: US 12,090,636 B2
(45) Date of Patent: Sep. 17, 2024

(54) ROBOT HAND DEVICE

(71) Applicant: MELTIN MMI CO., LTD., Tokyo (JP)

(72) Inventor: Tatsuya Seki, Tokyo (JP)

(73) Assignee: MELTIN MMI CO., LTD., Tokyo (JP)

( * ) Notice: Subject to any disclaimer, the term of this patent is extended or adjusted under 35 U.S.C. 154(b) by 670 days.

(21) Appl. No.: 17/324,473

(22) Filed: May 19, 2021

(65) Prior Publication Data
US 2021/0268664 A1 Sep. 2, 2021

Related U.S. Application Data

(63) Continuation of application No. PCT/JP2019/044303, filed on Nov. 12, 2019.

(30) Foreign Application Priority Data

Nov. 20, 2018 (JP) ................................ 2018-217223

(51) Int. Cl.
B25J 15/00 (2006.01)
B25J 9/10 (2006.01)
B25J 15/08 (2006.01)

(52) U.S. Cl.
CPC ......... B25J 15/0009 (2013.01); B25J 9/1075 (2013.01); B25J 15/08 (2013.01)

(58) Field of Classification Search
CPC ...... B25J 15/0009; B25J 15/08; B25J 15/022; B25J 9/1075

(Continued)

(56) References Cited

U.S. PATENT DOCUMENTS 4,921,293 A * 5/1990 Ruoff ...................... A61F 2/583
623/64
4,986,723 A * 1/1991 Maeda ................. B25J 15/0009
623/64

(Continued)

FOREIGN PATENT DOCUMENTS

JP 200823276 A 2/2008
JP 2008264896 A 11/2008

(Continued)

OTHER PUBLICATIONS

Tatsuya Seki et al., "Mechanism of Interference Driven Link for Myoelectric Hand—Proposal of Cross-Finger Biartcular Muscle Mechanism-", The 28th Annual Conference of the Robotics Society of Japan, Sep. 22 to 24, 2010, 6pp.

Primary Examiner — Paul T Chin
(74) Attorney, Agent, or Firm — Renner, Otto, Boisselle & Sklar, LLP

(57) ABSTRACT

A multi-fingered robot includes a plurality of finger mechanisms that each of which has a first wire for driving, a plurality of driving parts for bending that independently drives the first wire of each finger mechanism so as to bend each of the finger mechanisms, a connecting member that connects between at least one set of the first wires among a plurality of the first wires, and a driving controller that controls driving of the first wire of each of the finger mechanisms by the driving parts for bending. The driving controller causes the driving part for bending that drives the first wire of the second finger mechanism to assist the bending operation of the first finger mechanism via the extended connecting member if a difference between a first posture of the first finger mechanism and a second posture of the second finger mechanism is larger than a predetermined difference.

15 Claims, 15 Drawing Sheets

(58) Field of Classification Search
USPC .................................................. 294/111, 213
See application file for complete search history.

(56) References Cited

U.S. PATENT DOCUMENTS

| | | | | |
|---|---|---|---|---|
| 5,080,682 A | * | 1/1992 | Schectman | A61F 2/583 |
| | | | | 623/64 |
| 5,200,679 A | * | 4/1993 | Graham | B25J 15/0009 |
| | | | | 901/33 |
| 5,447,403 A | * | 9/1995 | Engler, Jr. | B25J 15/0009 |
| | | | | 294/111 |
| 8,483,880 B2 | * | 7/2013 | de la Rosa Tames | ................ |
| | | | | B25J 15/0009 |
| | | | | 600/595 |
| 10,821,601 B2 | * | 11/2020 | Baldoni | A61H 1/0274 |
| 11,597,099 B2 | * | 3/2023 | Zappatore | B25J 15/08 |
| 2007/0040400 A1 | | 2/2007 | Greenhil et al. | |
| 2010/0259057 A1 | | 10/2010 | Madhani | |
| 2011/0241368 A1 | | 10/2011 | Kurita et al. | |
| 2015/0230941 A1 | | 8/2015 | Jury | |
| 2016/0051382 A1 | | 2/2016 | Goldfarb et al. | |
| 2016/0325437 A1 | | 11/2016 | Laville et al. | |
| 2017/0217014 A1 | | 8/2017 | Riviere et al. | |

FOREIGN PATENT DOCUMENTS

| | | |
|---|---|---|
| JP | 2010240834 A | 10/2010 |
| JP | 2011245575 A | 12/2011 |
| JP | 2017503668 A | 2/2017 |
| JP | 2017531566 A | 10/2017 |
| WO | 2010064684 A1 | 6/2010 |
| WO | 2013012029 A1 | 1/2013 |
| WO | 2015063523 A2 | 5/2015 |
| WO | 2016182421 A1 | 11/2016 |
| WO | 2017038836 A1 | 3/2017 |

* cited by examiner

Wire arrangement on palm side

Wire arrangement on back side

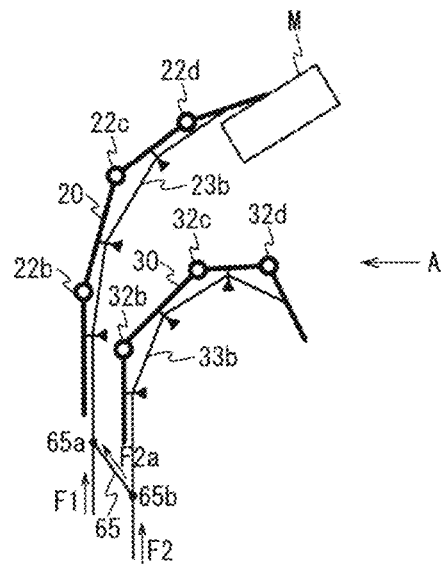 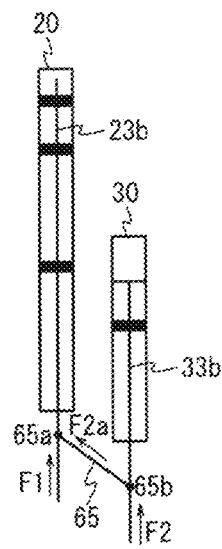
FIG. 8A          FIG. 8B
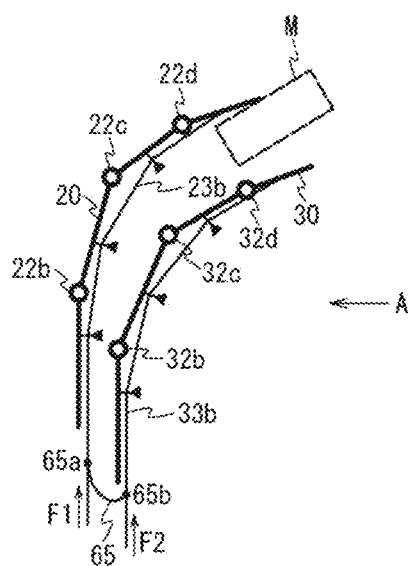 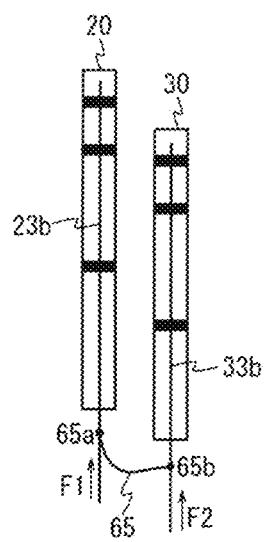
FIG. 9A          FIG. 9B Wire arrangement on palm side Wire arrangement on palm side Wire arrangement on back side

ROBOT HAND DEVICE

CROSS-REFERENCE TO RELATED APPLICATIONS

The present application is a continuation application of International Application No. PCT/JP2019/044303, filed on Nov. 12, 2019, which claims priority to Japanese Patent Application No. 2018-217223, filed on Nov. 20, 2018. The contents of these applications are incorporated herein by reference in their entirety.

BACKGROUND OF THE INVENTION

The present disclosure relates to a robot hand device.

Until now, research and development of robot hand devices which follow a shape of a human hand has been made. For example, Japanese Unexamined Patent Application Publication No. 2008-264896 discloses a technique of driving a plurality of finger mechanisms corresponding to respective fingers of a hand by respective independent actuators.

Since a large number of actuators are mounted on a robot hand device, weight reduction of the robot hand device is required. However, if, for example, the actuator of each finger mechanism is made smaller to reduce weight, the driving force for driving the finger mechanism becomes smaller.

BRIEF SUMMARY OF THE INVENTION

The present disclosure focuses on these points and an object of the present disclosure is to provide a robot hand device including a driving mechanism capable of appropriately driving a finger mechanism.

The first aspect of the present disclosure provides a robot hand device that includes a plurality of finger mechanisms that correspond to an index finger, a middle finger, a ring finger, and a little finger of a human hand, each of which has a first wire for driving, a plurality of driving parts for bending that independently drives the first wire of each finger mechanism so as to bend each of the finger mechanisms, a connecting member that provides a connection between at least one set of the first wires among a plurality of the first wires, and a driving controller that controls driving of the first wire of each of the finger mechanisms by the driving parts for bending, wherein the driving controller causes the driving part for bending that drives the first wire of the second finger mechanism to assist with the bending operation of the first finger mechanism via the extended connecting member if a difference between a first posture of the first finger mechanism and a second posture of the second finger mechanism is larger than a predetermined difference when at least the first finger mechanism and the second finger mechanism of the plurality of finger mechanisms bend.

BRIEF DESCRIPTION OF THE DRAWINGS

FIGS. 8A and 8B are schematic diagrams for illustrating a state where a driving force is distributed.

FIGS. 9A and 9B are schematic diagrams for illustrating a state where the driving force is not distributed.

DETAILED DESCRIPTION OF THE INVENTION

First Embodiment (A Configuration of a Multi-Fingered Robot)

A configuration of a multi-fingered robot 1 as a robot hand device according to the first embodiment will be described referring to FIGS. 1 and 2.

Figure 1:
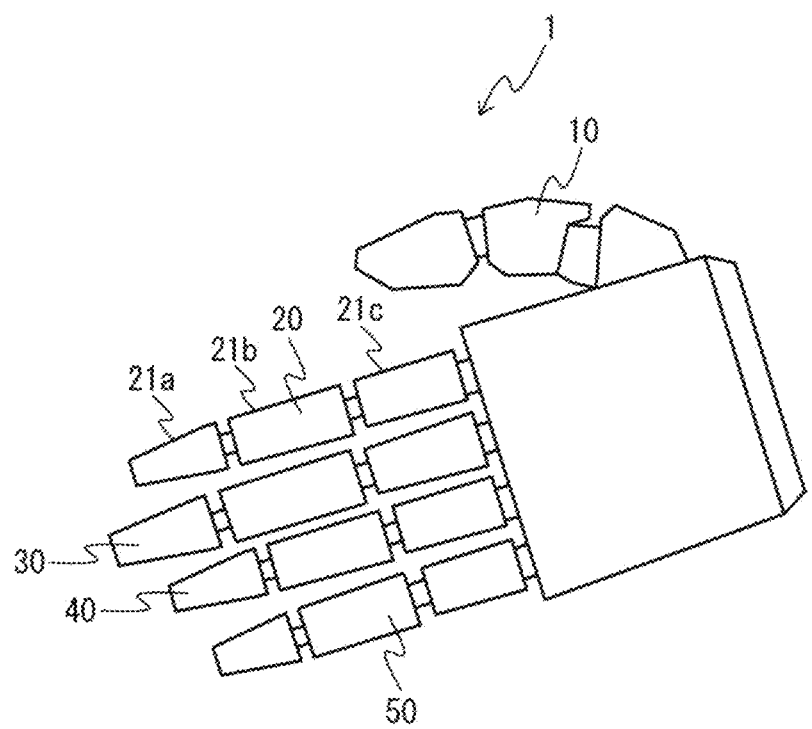
FIG. 1 is a schematic diagram for illustrating an example of an exterior configuration of a multi-fingered robot 1 according to the first embodiment of the present disclosure.

FIG. 1 is a schematic diagram for illustrating an example of an exterior configuration of the multi-fingered robot 1 according to the first embodiment. FIG. 2 is a block diagram for illustrating a configuration of the multi-fingered robot 1.

The multi-fingered robot 1 is a humanoid robot hand which has a shape following a shape of a human hand, as shown in FIG. 1, for example. Further, the multi-fingered robot 1 is a remote control robot that is remotely controlled by an operator. Specifically, the multi-fingered robot 1 operates in conjunction with the motion of the operator's hand in the same way as said hand. The multi-fingered robot 1 touches or grasps an object. It should be noted that FIG. 1 shows the robot hand which imitates a human right hand as the multi-fingered robot 10, but a robot hand which imitates a human left hand has a similar configuration.

Figure 2:
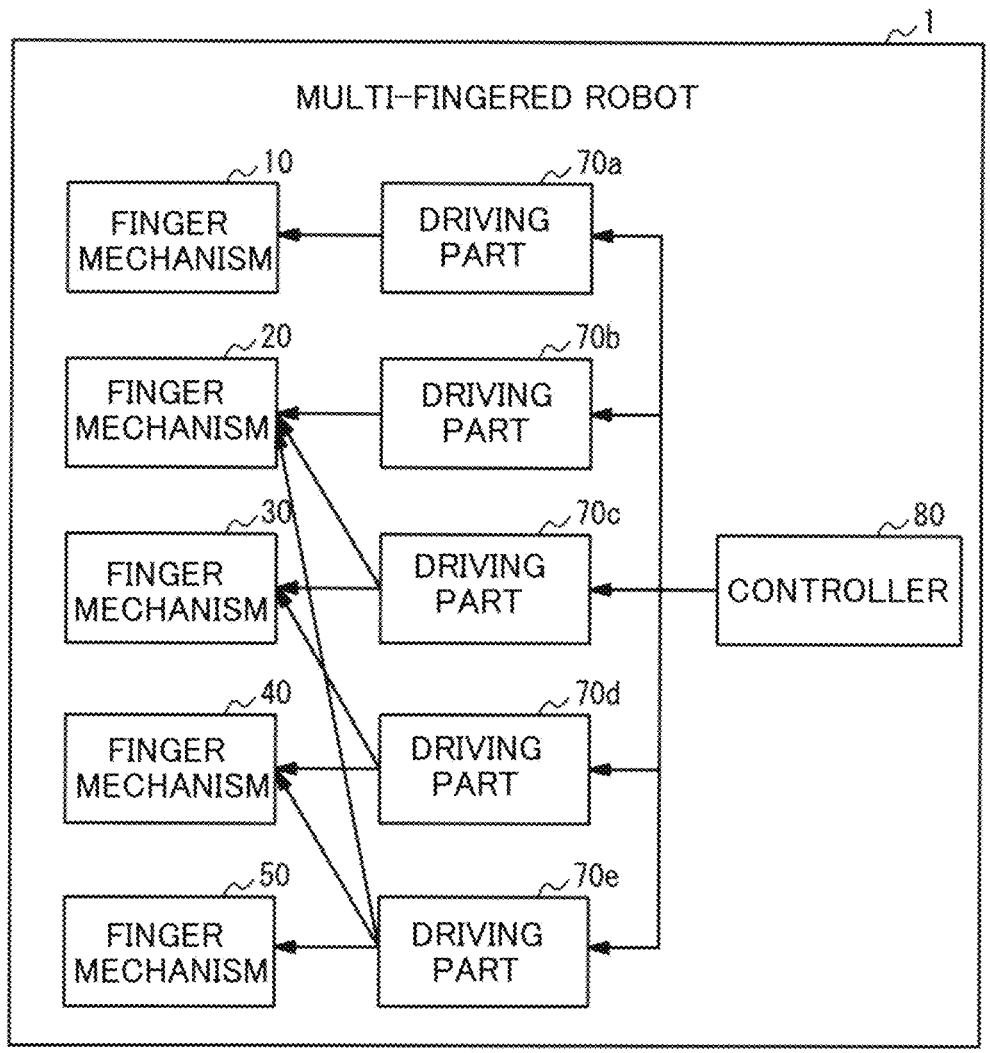
FIG. 2 is a block diagram for illustrating a configuration of the multi-fingered robot 1.

As shown in FIG. 2, the multi-fingered robot 1 includes finger mechanisms 10, 20, 30, 40, and 50, driving parts 70a, 70b, 70c, 70d, and 70e, and a controller 80.

The finger mechanisms 10, 20, 30, 40, and 50 are finger structures corresponding to the five fingers of a human hand. Here, the finger mechanism 10 is a finger mechanism following after a thumb of a human hand, the finger mechanism 20 is a finger mechanism following after an index finger, the finger mechanism 30 is a finger mechanism following after a middle finger, the finger mechanism 40 is a finger mechanism following after a ring finger, and the finger mechanism 50 is a finger mechanism following after a little finger. The finger mechanisms 10, 20, 30, 40, and 50 bend and extend. Further, the finger mechanisms 20, 30, 40, and 50 spread or shrink the space between the mechanisms (hereinafter also referred to as "open and close").

The finger mechanisms 10, 20, 30, 40, and 50 each include a plurality of phalanges. For example, as shown in FIG. 1, a distal phalange 21a, a middle phalange 21b, and a proximal phalange 21c are formed in the finger mechanism 20, starting from the finger-tip. Further, the finger mechanisms 10, 20, 30, 40, and 50 each include a plurality of joint parts.

Figure 3:
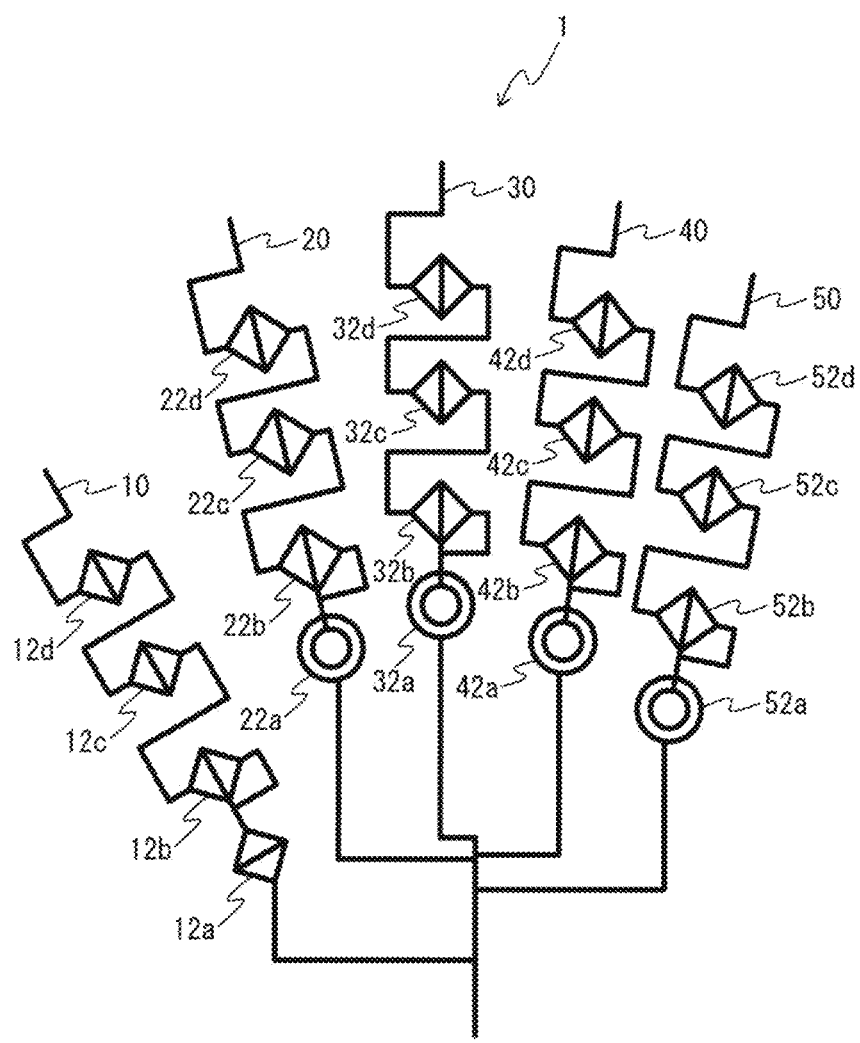
FIG. 3 is a schematic diagram for illustrating joint parts of finger mechanisms 10, 20, 30, 40, and 50.

FIG. 3 is a schematic diagram for illustrating joint parts of the finger mechanisms 10, 20, 30, 40, and 50. The finger mechanism 10 includes a plurality of joint parts 12a, 12b, 12c, and 12d. The joint parts 12b, 12c, and 12d each are portions for bending and extending the finger mechanism 10. The joint part 12a is a portion for twisting the finger mechanism 10.

The finger mechanism 20 includes four joint parts 22a, 22b, 22c, and 22d. Similarly, the finger mechanism 30 includes four joint parts 32a, 32b, 32c, and 32d, the finger mechanism 40 includes four joint parts 42a, 42b, 42c, and 42d, and the finger mechanism 50 includes four joint parts 52a, 52b, 52c, and 52d. The joint parts 22b, 22c, and 22d of the finger mechanism 20, the joint parts 32b, 32c, and 32d of the finger mechanism 30, the joint parts 42b, 42c, and 42d of the finger mechanism 40, and the joint part 52b, 52c, and 52d of the finger mechanism 50 are portions for bending or extending the finger mechanisms 20, 30, 40, and 50, respectively. The joint part 22a of the finger mechanism 20, the joint part 32a of the finger mechanism 30, the joint part 42a of the finger mechanism 40, and the joint part 52a of the finger mechanism 50 are portions that are moved so as to open and close the finger mechanisms 20, 30, 40, and 50.

The finger mechanisms 10, 20, 30, 40, and 50 are bent by driving bending wires (bending wires 23a and 23b and the like, to be described later) which are first wires, and are extended by driving extending wires (extending wires 24a and 24b and the like, to be described later) which are second wires. For example, the finger mechanism 20 is bent by the bending wires 23a and 23b as shown in FIG. 4.

Figure 4:
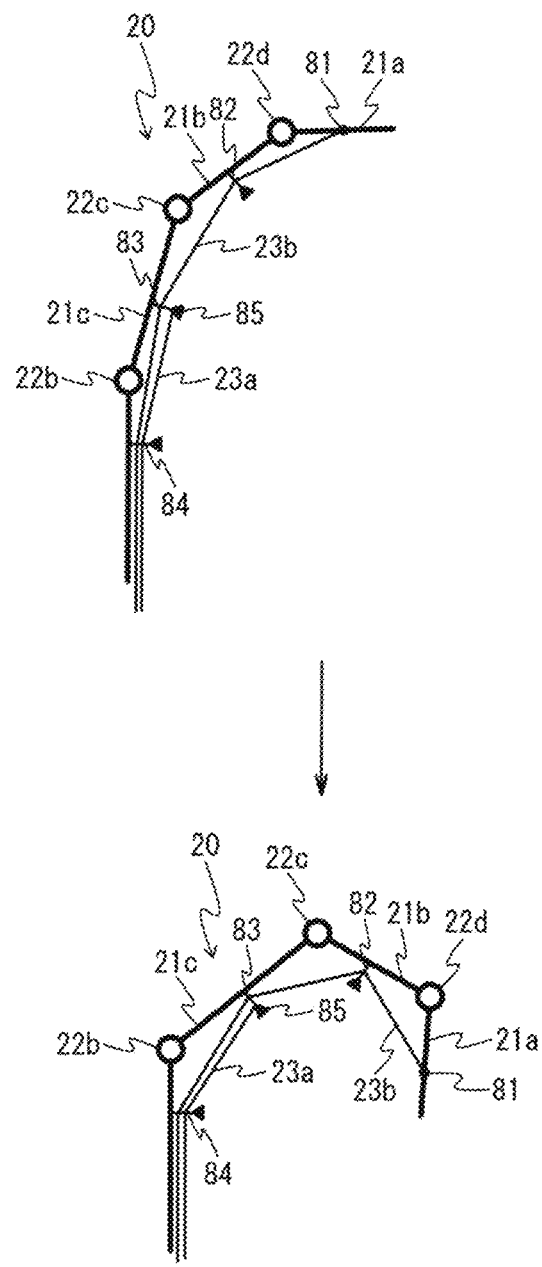
FIG. 4 is a schematic diagram for illustrating an example of the finger mechanism 20 being bent by bending wires.

FIG. 4 is a schematic diagram for illustrating an example of the finger mechanism 20 being bent by bending wires 23a and 23b. As shown in FIG. 4, the finger mechanism 20 is bent by the bending wires 23a and 23b disposed on the palm side, which are driven. Here, the entire finger mechanism 20 is bent by driving the bending wires 23a and 23b together. It should be noted that the details of the wires provided in the finger mechanisms 10, 20, 30, 40, and 50 will be described later.

In the above description, the entire finger mechanism 20 is bent by the bending wires 23a and 23b, and the entire finger mechanism 20 is extended by the extending wires 24a and 24b, but the present disclosure is not limited thereto. For example, each joint of the finger mechanism 20 may be controlled as desired by appropriate control of the bending wires 23a and 23b (extending wires 24a and 24b), which are driven independently of each other.

Driving parts 70a, 70b, 70c, 70d, and 70e (FIG. 2) include actuators and drive each of the finger mechanisms 10, 20, 30, 40, 50. The driving parts 70a, 70b, 70c, 70d, and 70e bend and extend the finger mechanisms 10, 20, 30, 40, and 50 by independently wire-driving each of the finger mechanisms 10, 20, 30, 40, and 50. For example, the driving part 70b bends the finger mechanism 20 by driving the bending wires 23a and 23b of the finger mechanism 20, and extends the finger mechanism 20 by driving the extending wires 24a and 24b of the finger mechanism 20. Thus, each of the driving parts 70a, 70b, 70c, 70d, and 70e functions as a driving part for bending and a driving part for extending.

The driving part 70c can assist with the bending operation of the finger mechanism 20 when the driving part 70b makes the finger mechanism 20 perform the bending operation (bend). The driving part 70d can assist with the bending operation of the finger mechanism 30 when the driving part 70c makes the finger mechanism 30 perform the bending operation. The driving part 70e can assist with the bending operation of the finger mechanism 40 when the driving part 70d makes the finger mechanism 40 perform the bending operation. Further, the driving part 70e can assist with the bending operation of the finger mechanism 20 when the driving part 70b makes the finger mechanism 20 perform the bending operation.

The controller 80 controls the operation of the multi-fingered robot 1. The controller 80 controls the wire-driving of the finger mechanisms 10, 20, 30, 40, and 50 by the driving parts 70a, 70b, 70c, 70d, and 70e to independently bend and extend each of the finger mechanisms 10, 20, 30, 40, and 50. That is, the controller 80 functions as a driving controller that controls the driving of the wire. The controller 80 includes, for example, a Central Processing Unit (CPU).

(A Wire Arrangement on the Finger Mechanism)

The wire arrangement on the finger mechanisms 10, 20, 30, 40, and 50 will be described by referring to FIGS. 5 to 7.

Figure 5:
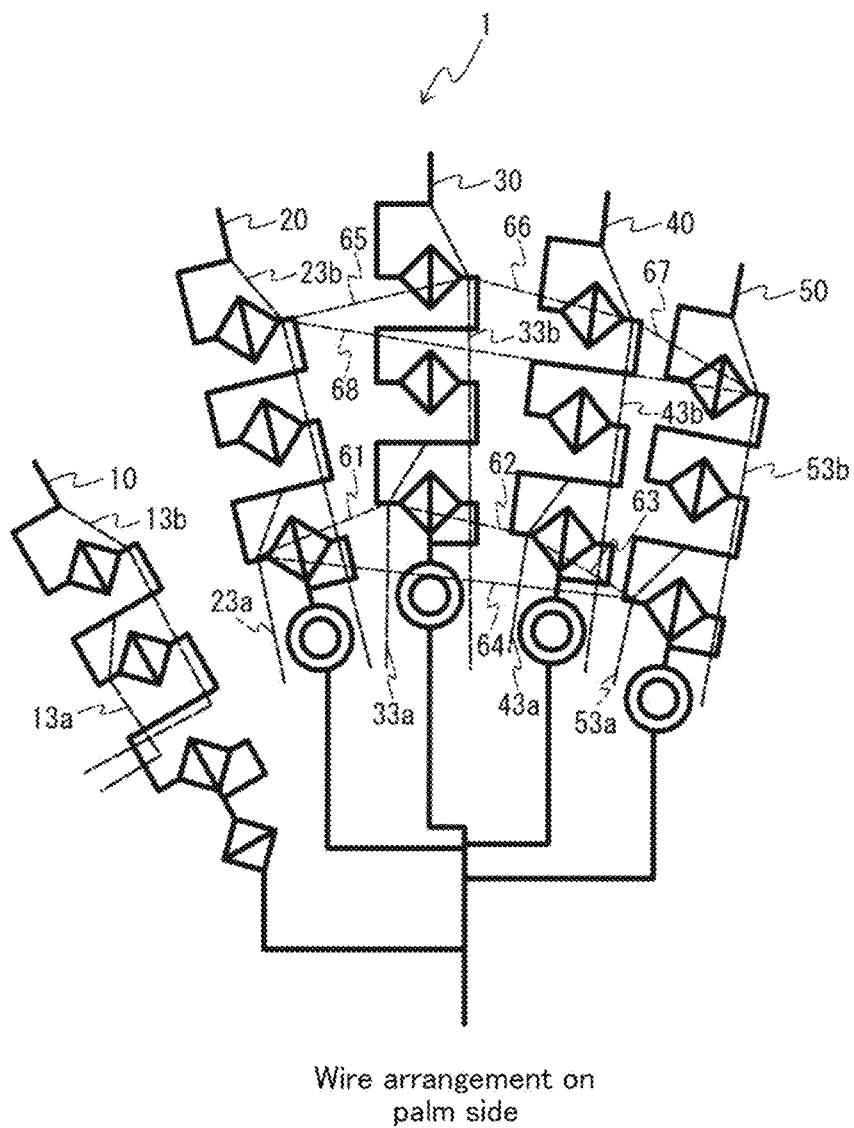
FIG. 5 is a schematic diagram for illustrating an exemplary wire arrangement on a palm side of the multi-fingered robot 1.

FIG. 5 is a schematic diagram for illustrating an exemplary wire arrangement on a palm side of the multi-fingered robot 1. FIG. 6 is a schematic diagram for illustrating an exemplary wire arrangement on a back side of the hand of the multi-fingered robot 1. FIG. 7 is a schematic diagram for illustrating an exemplary arrangement of the bending wires and the extending wires in the finger mechanism 20. In FIGS. 5 and 6, the wires are shown as broken lines or one-dot chain lines for convenience of explanation.

On the palm side of the multi-fingered robot 1, as shown in FIG. 5, bending wires 13a and 13b, the bending wires 23a and 23b, bending wires 33a and 33b, bending wires 43a and 43b, bending wires 53a and 53b, connecting wires 61, 62, 63 and 64, and connecting wires 65, 66, 67 and 68 are provided. In the present embodiment, the connecting wires 61, 62, 63, and 64 and the connecting wires 65, 66, 67, and 68 correspond to connecting members.

The bending wires 13a and 13b are wires provided on the finger mechanism 10 and are driven to bend the finger mechanism 10. The bending wire 13a has its tip end connected to a center portion in the longitudinal direction of the finger mechanism 10 (for example, between the joint parts 12c and 12d), and the bending wire 13b has its tip end connected to a distal end portion of the finger mechanism 10 (for example, a portion even closer to the distal end than the joint part 12d). The bending wire 13a bends the proximal side portion of the finger mechanism 10, and the bending wire 13b bends the entire finger mechanism 10. The bending wires 13a and 13b are connected to different driving sources (actuators) of the driving part 70a via pulleys or the like, respectively, and can be driven independently of each other. For example, the bending wire 13a alone bends the finger mechanism 10, or the bending wires 13a and 13b are driven together to bend the finger mechanism 10.

The bending wires 23a and 23b are provided on the finger mechanism 20, and are driven to bend the finger mechanism 20. The bending wires 33a and 33b are provided on the finger mechanism 30, and are driven to bend the finger mechanism 30. The bending wires 43a and 43b are provided on the finger mechanism 40, and are driven to bend the finger mechanism 40. The bending wires 53a and 53b are provided on the finger mechanism 50, and are driven to bend the finger mechanism 50. In the present embodiment, the bending wires 23a, 33a, 43a, and 53a correspond to proximal side wires, and the bending wires 23b, 33b, 43b, and 53b correspond to finger-tip side wires. The bending wires 23a, 33a, 43a, and 53a are connected at their respective tip ends to center portions in the longitudinal directions of the finger mechanisms 20, 30, 40, and 50 (for example, the bending wire 23a is connected between the joint parts 22b and 22c, the bending wire 33a is connected between the joint parts 32b and 32c, the bending wire 43a is connected between the joint parts 42b and 42c, and the bending wire 53a is connected between the joint parts 52b and 52c), and the bending wires 23b, 33b, 43b, and 53b are connected at their respective tip ends to the distal end portions of the finger mechanisms 20, 30, 40, and 50 (for example, the bending wire 23b is connected at a portion even closer to the distal end than the joint part 22d, the bending wire 33b is connected at a portion even closer to the distal end than the joint part 32d, the bending wire 43b is connected at t a portion even closer to the distal end than the joint part 42d, and the bending wire 53b is connected at a portion even closer to the distal end than the joint part 52d) (see FIG. 7). The bending wires 23a, 33a, 43a, and 53a bend the proximal side portions of the finger mechanisms 20, 30, 40, and 50, respectively, and the bending wires 23b, 33b, 43b, and 53b bend the entire finger mechanisms 20, 30, 40, and 50, respectively.

The bending wires 23a, 23b, 33a, 33b, 43a, 43b, 53a, and 53b are configured to contact guide parts of respective finger mechanisms disposed closer to the proximal side than the tip end of each bending wire in addition to the connecting part to which the tip end of each bending wire is connected, and the movement thereof is regulated (However, the wires are not always in contact with the guide parts, and it is sufficient that contact can be made when a force in a predetermined direction is exerted on each bending wire).

Here, the bending wires 23a and 23b will be described as an example. As shown in FIG. 4, the finger mechanism 20 is provided with a connecting part 81 connected to the distal end of the bending wire 23b, a plurality of guide parts 82, 83, and 84, and a connecting part 85 connected to the distal end of the bending wire 23a. The connecting part 85 is provided at the distal end of the guide part 83. The guide part 82 is provided between the joint part 22d and the joint part 22c, the guide part 83 is provided between the joint part 22c and the joint part 22b, and the guide part 84 is provided between the joint part 22b and the joint part 22a (see FIG. 3). The guide parts 82, 83, and 84 include, for example, hooking parts with which the bending wire 23b comes into contact, and regulate the posture of the bending wire 23b when the finger mechanism 20 bends and extends. Further, the guide part 84 includes, for example, a hooking part with which the bending wire 23a comes into contact, and regulates the posture of the bending wire 23a when the finger mechanism 20 bends and extends. As a result, the force acting on the bending wires 23a and 23b also acts on the finger mechanism 20 via the guide parts 82, 83, and 84, thereby enabling drive control more closely resembling the movement of an actual finger joint. For example, since both the forces of the bending wires 23a and 23b act near the connecting part 85, it is possible to exert a large force on the connecting part 85 with a relatively small driving force.

The bending wires 23a and 23b are connected to different driving sources (actuators) of the driving part 70b via pulleys or the like, respectively, and can be driven independently of each other. For example, the bending wire 23a alone bends the finger mechanism 20, or the bending wires 23a and 23b are driven together to bend the finger mechanism 20. Similarly, the bending wires 33a and 33b, the bending wires 43a and 43b, and the bending wires 53a and 53b are respectively connected to different driving sources of the driving parts 70c, 70d, and 70e via pulleys or the like, and can be driven independently of each other.

The connecting wires 61, 62, 63, and 64 provide connections between at least one set of bending wires among the bending wires 23a, 33a, 43a, and 53a of the finger mechanisms 20, 30, 40, and 50. Specifically, the connecting wire 61 connects the bending wire 23a and the bending wire 33a, the connecting wire 62 connects the bending wire 33a and the bending wire 43a, and the connecting wire 63 connects the bending wire 43a and the bending wire 53a. That is, the connecting wires 61, 62, and 63 connect the bending wires of the adjacent finger mechanisms among the finger mechanisms 20, 30, 40, and 50. It should be noted that the connecting wire 64 connects the bending wire 53a and the bending wire 23a. That is, the connecting wire 64 connects the bending wire 53a of the finger mechanism 50 corresponding to the little finger and the bending wire 23a of the finger mechanism 20 corresponding to the index finger.

The connecting wires 65, 66, 67, and 68 provide connections between at least one set of bending wires among the bending wires 23b, 33b, 43b, and 53b of the finger mechanisms 20, 30, 40, and 50. Specifically, the connecting wire 65 connects the bending wire 23b and the bending wire 33b, the connecting wire 66 connects the bending wire 33b and the bending wire 43b, and the connecting wire 67 connects the bending wire 43b and the bending wire 53b. That is, the connecting wires 65, 66, and 67 connect the bending wires of the adjacent finger mechanisms among the finger mechanisms 20, 30, 40, and 50. It should be noted that the connecting wire 68 connects the bending wire 53b and the bending wire 23b. That is, the connecting wire 68 connects the bending wire 53b of the finger mechanism 50 corresponding to the little finger and the bending wire 23b of the finger mechanism 20 corresponding to the index finger.

It should be noted that, in FIG. 5, the connecting wires 61, 62, 63, and 64 are directly connected to the bending wires 23a, 33a, 43a, and 53a, and the connecting wires 65, 66, 67, and 68 are directly connected to the bending wires 23b, 33b, 43b, and 53b, but the present disclosure is not limited thereto. For example, the connecting wires 61, 62, 63, and 64 may be indirectly connected to the bending wires 23a, 33a, 43a, and 53a via a metal fitting, a rod, or the like, and the connecting wires 65, 66, 67, and 68 may be indirectly connected to the bending wires 23b, 33b, 43b, and 53b via a metal fitting, a rod, or the like.

In the present embodiment, the connecting wires 61, 62, 63, and 64 correspond to the proximal-side connecting members, and the connecting wires 65, 66, 67, and 68 correspond to the fingertip side connecting members. It should be noted that the connecting wires 61 to 68 are shown to be extended in FIG. 5, but they are actually connected between the bending wires in a slack state. The connecting wires 61 to 68 are extended when the postures of the adjacent finger mechanisms are different from each other.

The connecting wires 61, 62, 63, and 64 and the connecting wires 65, 66, 67, and 68 have a function of distributing the driving forces of the driving parts 70a, 70b, 70c, and 70d when bending the finger mechanisms 20, 30, 40, and 50. In the present embodiment, when at least two finger mechanisms (for example, the finger mechanisms 20 and 30) of the finger mechanisms 20, 30, 40, and 50 are bent, the controller 80 (FIG. 2) causes the driving part 70c, which drives the bending wires 33a and 33b of the finger mechanism 30, to assist with the bending operation of the finger mechanism 20 through the extended connecting wires 61 and 65 if the difference between a first posture of the finger mechanism 20 and a second posture of the finger mechanism 30 is greater than a predetermined difference. Thus, the finger mechanism 20 is bent by the driving forces of the driving parts 70b and 70c. It should be noted that the predetermined difference is a difference between the two postures such that the connecting wire 61 (65) connected in a slack state between the bending wire 23a (23b) and the bending wire 33a (33b) is in a taut state.

Hereinafter, the connecting wire 65 connecting the bending wire 23b of the finger mechanism 20 and the bending wire 33b of the finger mechanism 30 will be described by referring to FIGS. 8 and 9.

FIGS. 8A and 8B are schematic diagrams for illustrating a state where the driving force is distributed. FIGS. 9A and 9B are schematic diagrams for illustrating a state where the driving force is not distributed. FIG. 8B and FIG. 9B are schematic diagrams of FIG. 8A and FIG. 9A as viewed in the direction of an arrow A. It should be noted that in FIGS. 8 and 9, the position of the connecting wire 65 is different from the position shown in FIG. 5, for convenience of explanation.

Here, it is assumed that the finger mechanism 20 grasps an object M together with the finger mechanism 10 (contributing to the operation), while the finger mechanism 30 does not act on the object M (does not contribute to the operation). In this case, the finger mechanism 20 corresponds to a first finger mechanism, and the finger mechanism 30 corresponds to a second finger mechanism adjacent to the first finger mechanism. It should be noted that the second finger mechanism is a finger mechanism adjacent to the first finger mechanism in the direction from the index finger toward the little finger.

The connecting wire 65 connects the bending wire 23b of the finger mechanism 20 to the bending wire 33b of the finger mechanism 30, and transitions between a slack state and a taut state depending on the difference in posture between the finger mechanism 20 and the finger mechanism 30. For example, as shown in FIG. 9, when the finger mechanism 20 and the finger mechanism 30 are in almost the same posture (the difference between the two postures is smaller than the predetermined difference), the connecting wire 65 is slack. On the other hand, as shown in FIG. 8, when the finger mechanism 30 is greatly bent as compared with the finger mechanism 20 (the difference between the two postures is greater than the predetermined difference), the distance between the connection points 65a and 65b of the connecting wire 65 is greater, and the connecting wire 65 is taut.

Then, the connecting wire 65 exerts a function of distributing the driving force when it is taut as shown in FIG. 8. That is, the connecting wire 65 transmits a driving force F2a, which is a portion of the driving force F2 for driving the bending wire 33b, to the bending wire 23b. As a result, the finger mechanism 20 is bent by the driving force F1 and the driving force F2a, the driving force F1 being a driving force of the driving part 70b to which the bending wire 23b is connected, and the driving force F2a being transmitted through the connecting wire 65. Consequently, the finger mechanism 20 can be bent with a larger driving force than when the finger mechanism 20 is bent only by the driving part 70b to which the bending wire 23b is connected. In other words, the finger mechanism 20 can be operated properly without increasing the size of the driving part 70b (driving source) to which the bending wire 23b is connected. Although the finger mechanism 30 does not contribute to the operation, the driving force of the driving part 70c of the finger mechanism 30 can be utilized effectively by using the driving force of the driving part 70c.

In particular, when grasping the object M as shown in FIG. 8, not only the finger mechanism 20 but also the finger mechanisms 30, 40, and 50 operate together. That is, the finger mechanism 20 grasps the object M together with the finger mechanism 10 while bending the finger mechanisms 30, 40, and 50. Therefore, when the connecting wires 61 to 68 are provided as described above, the bending operation of the finger mechanism 20 can be automatically assisted when the finger mechanisms 20, 30, 40, and 50 operate together without the need for complicated mechanisms or the like.

On the other hand, the connecting wire 65 does not exert the function of distributing the driving force when the connecting wire 65 is slack as shown in FIG. 9. That is, the driving force F2 for driving the bending wire 33b is not transmitted to the bending wire 23b through the connecting wire 65.

In FIG. 8, the connection wire 65 between the finger mechanism 20 and the finger mechanism 30 has been described, but when the finger mechanism 20 grasps the object M together with the finger mechanism 10, the finger mechanism 50 is in the same posture as the finger mechanism 30. In this embodiment, the connecting wires 64 and 68 are also connected between the bending wires 23a and 23b of the finger mechanism 20 and the bending wires 53a and 53b of the finger mechanism 50 (see FIG. 5). Therefore, the driving force of driving part 70e of the finger mechanism 50 is transmitted to the finger mechanism 20 through the extended connecting wires 64 and 68. This allows the effective use of the driving parts 70c and 70e, since the finger mechanism 20 is also driven by the driving parts 70c and 70e that would not normally contribute to the operation.

Figure 6:
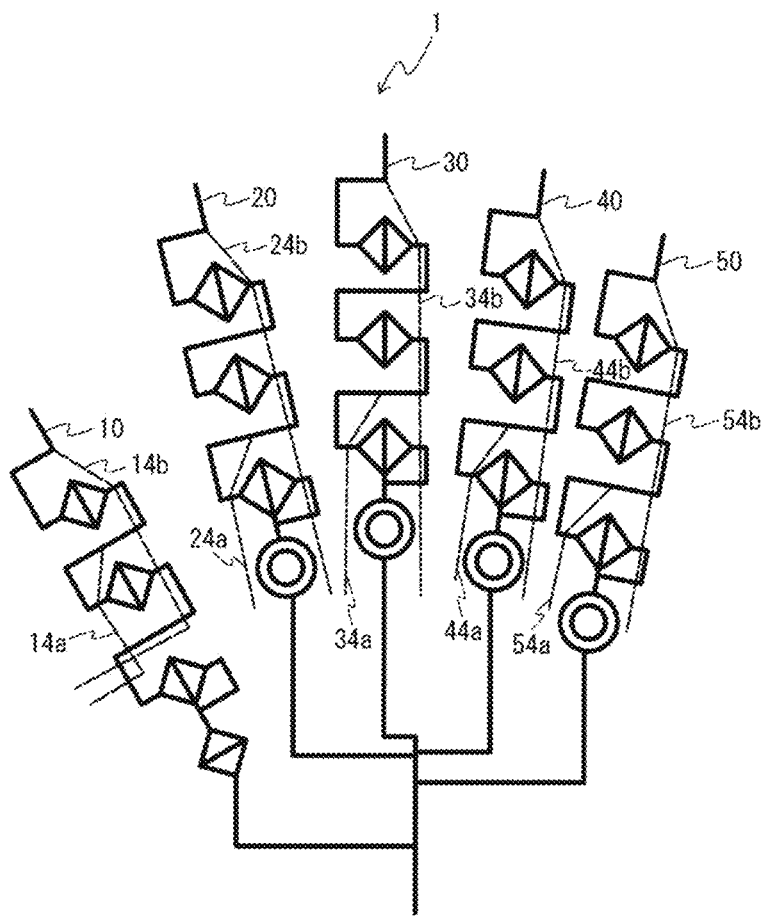
FIG. 6 is a schematic diagram for illustrating an exemplary wire arrangement on a back side of a hand of the multi-fingered robot 1.
Figure 7:
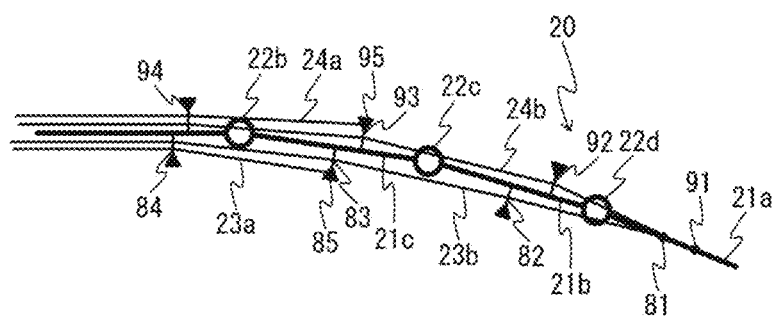
FIG. 7 is a schematic diagram for illustrating an exemplary arrangement of bending wires and extending wires of the finger mechanism 20.

On the back side of the hand of the multi-fingered robot 1, as shown in FIG. 6, there are extending wires 14a and 14b, extending wires 24a and 24b, extending wires 34a and 34b, extending wires 44a and 44b, and extending wires 54a and 54b.

The extending wires 14a and 14b are wires provided on the finger mechanism 10 and are driven to extend the finger mechanism 10. The extending wire 14a is connected to the center portion in the longitudinal direction of the finger mechanism 10, and the extending wire 14b is connected to the distal end portion of the finger mechanism 10. The extending wire 14a extends the proximal side portion of the finger mechanism 10, and the extending wire 14b extends the entire finger mechanism 10. The extending wires 14a and 14b are connected to different driving sources (actuators) of the driving part 70a via pulleys or the like, respectively, and can be driven independently of each other. For example, the extending wire 14a alone extends the finger mechanism 10, or the extending wires 14a and 14b are driven together to extend the finger mechanism 10.

The extending wires 24a and 24b are provided on the finger mechanism 20 and are driven to extend the finger mechanism 20. The extending wires 34a and 34b are provided on the finger mechanism 30 and are driven to extend the finger mechanism 30. The extending wires 44a and 44b are provided on the finger mechanism 40 and are driven to extend the finger mechanism 40. The extending wires 54a and 54b are provided on finger mechanism 50 and are driven to extend finger mechanism 50. The extending wires 24a, 34a, 44a, and 54a are connected to the center portions in the longitudinal directions of the finger mechanisms 20, 30, 40, and 50, respectively, and the extending wires 24b, 34b, 44b, and 54b are connected to the distal portions of the finger mechanisms 20, 30, 40, and 50, respectively. The extending wires 24a, 34a, 44a, and 54a extend the proximal side portions of the finger mechanisms 20, 30, 40, and 50, respectively, and the extending wires 24b, 34b, 44b, and 54b extend the entire finger mechanisms 20, 30, 40, and 50, respectively.

Here, a connection configuration of the extending wires 24a and 24b will be explained with reference to FIG. 7. The connection configuration of the extending wires 24a and 24b is the same as the connection configuration of the bending wires 23a and 23b described above. Specifically, the extending wire 24b is guided by guide parts 92, 93, and 94, and the tip end of the extending wire 24b is connected to a connecting part 91. Similarly, the extending wire 24a is guided by the guide part 94 and the tip end of the extending wire 24a is connected to the connecting part 95.

The extending wires 24a and 24b are connected to different driving sources (actuators) of the driving part 70b via pulleys or the like, respectively, and can be driven independently of each other. For example, the extending wire 24a alone extends the finger mechanism 20, or the extending wires 24a and 24b are driven together to extend the finger mechanism 20. Similarly, the extending wires 34a and 34b, the extending wires 44a and 44b, and the extending wires 54a and 54b are connected to different driving sources of the driving parts 70c, 70d, and 70e via pulleys or the like, respectively, and can be driven independently of each other.

(Variations)

In the above description, the extending wires 24b, 34b, 44b, and 54b of the finger mechanisms 20, 30, 40, and 50 are driven by the different driving parts 70b, 70c, 70d, and 70e, respectively, but the present disclosure is not limited thereto. For example, as shown in FIG. 10, four extending wires 24b, 34b, 44b, and 54b may be driven by one driving part.

Figure 10:
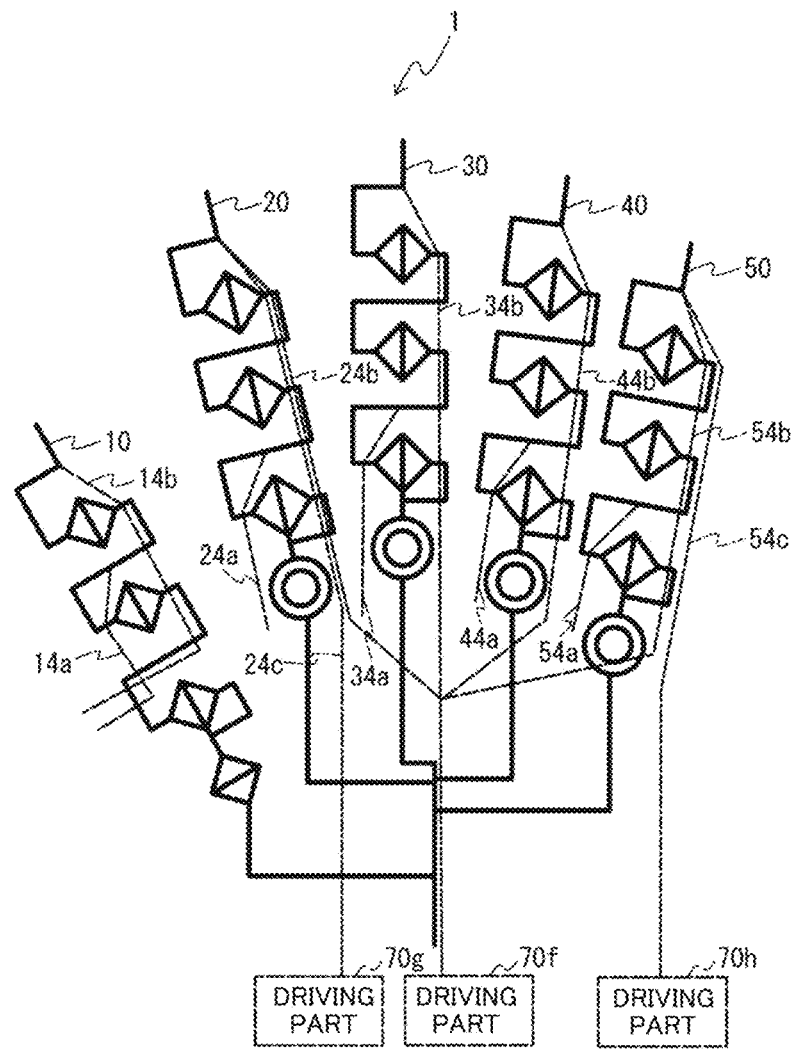
FIG. 10 is a schematic diagram for illustrating a variation.

FIG. 10 is a schematic diagram for illustrating a variation. FIG. 10 shows the wire arrangement on the back side of the hand. The extending wires 24b, 34b, 44b, and 54b are grouped together at the connecting point as shown in FIG. 10. The wires grouped together are connected to the driving part 70f. The driving part 70f simultaneously extends the extending wires 24b, 34b, 44b, and 54b by driving a single wire that is grouped together. As described above, the driving part 70f drives the extending wires 24b, 34b, 44b, and 54b collectively, thereby suppressing the number of driving parts for driving the extending wires 24b, 34b, 44b, and 54b. It should be noted that, in the variation, the driving part 70f corresponds to a first driving part for extending.

Further, in the variation, as shown in FIG. 10, the finger mechanism 20 corresponding to the index finger is provided with a third wire, which is an extending wire 24c, in addition to the extending wires 24a and 24b, and the finger mechanism 50 corresponding to the little finger is provided with a fourth wire, which is an extending wire 54c, in addition to the extending wires 54a and 54b. The extending wire 24c is connected to the distal end portion of the finger mechanism 20, and is a wire for extending the finger mechanism 20. The extending wire 54c is connected to the distal end portion of the finger mechanism 50, and extends the finger mechanism 50. The extending wire 24c extends the entire finger mechanism 20 and the extending wire 54c extends the entire finger mechanism 50.

The extending wire 24c is connected to the driving part 70g, and is independently wire-driven by the driving part 70g. The extending wire 54c is connected to the driving part 70h, and is independently wire-driven by the driving part 70h. The wire-driving by the driving parts 70f, 70g, and 70h is controlled by the controller 80 (FIG. 2). For example, when the controller 80 drives the extending wires 24b, 34b, 44b, and 54b with the driving part 70f, the controller 80 causes the driving part 70g to drive the extending wire 24c and causes the driving part 70h to drive the extending wire 54c. It should be noted that, in the variation, the driving part 70g corresponds to a second driving part for extending that independently extends the finger mechanism 20, and the driving part 70h corresponds to a third driving part for extending that independently extends the finger mechanism 50.

Among the index, middle, ring and little fingers, humans extend either the index or little finger, or extend the index and little fingers together. Therefore, in the variation, the multi-fingered robot 1 can follow the movement similar to that of a human hand by providing the extending wire 24c to the finger mechanism 20 corresponding to the index finger and the extending wire 54c to the finger mechanism 50 corresponding to the little finger. In the variations, there are three driving parts 70f, 70g, and 70h that drive the extending wires 24b, 34b, 44b, and 54b and the extending wires 24c and 54c connected to the distal end portions of the finger mechanisms 20, 30, 40, and 50. That is, the number of driving parts is less than the number of driving parts (the driving parts 70b, 70c, 70d, and 70e) that drive the extending wires 24b, 34b, 44b, and 54b in the configuration described in FIG. 6. Therefore, movement close to the movement of the human hand can be reproduced while suppressing the number of driving parts of the multi-fingered robot 1.

Further, in the above description, the connection wire 64 connecting the bending wire 23a to the bending wire 53a and the connection wire 68 connecting the bending wire 23b to the bending wire 53b are provided, but the present disclosure is not limited thereto. For example, as shown in FIG. 11, the connecting wire 64 and the connecting wire 68 do not have to be provided.

Figure 11:
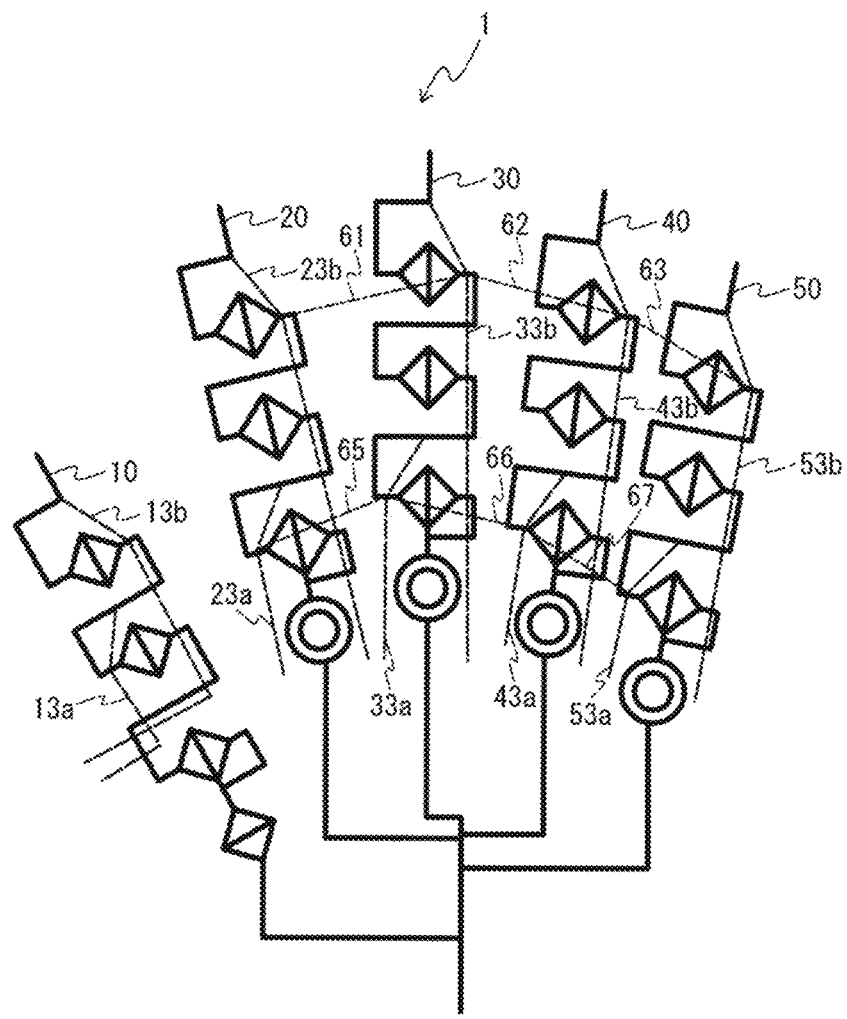
FIG. 11 is a schematic diagram for illustrating a second variation.

FIG. 11 is a schematic diagram for illustrating a second variation. In the second variation, the connecting wires 61, 62, and 63 provide connections between the bending wires 23a, 33a, 43a, and 53a, and the connecting wires 65, 66, and 67 provide connections between the bending wires 23b, 33b, 43b, and 53b.

In the above description, the bending wires 23a, 33a, 43a, 53a, 23b, 33b, 43b, and 53b are guided by the guide parts 82, 83, and 84 shown in FIG. 4, but the present disclosure is not limited thereto.

Figure 12:
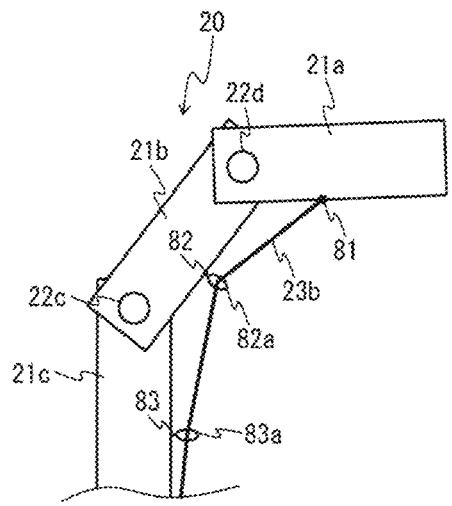
FIG. 12 is a schematic diagram for illustrating a third variation.

FIG. 12 is a schematic diagram for illustrating a third variation. In FIG. 12, the bending wire 23b and the guide parts 82 and 83 are shown for convenience of explanation. The guide parts 82 and 83 of the third variation have ring parts 82a and 83a for regulating the posture of the bending wire 23b when the finger mechanism 20 bends and extends. The bending wire 23b is inserted through the holes of the ring parts 82a and 83a. When the finger mechanism 20 is bent and extended, the bending wire 23b contacts the ring parts 82a and 83a to regulate its posture. It should be noted that, although not shown in FIG. 12, the bending wire 23a is also inserted through a ring part of the guide part 84 having the same configuration as that of the guide part 83. In addition, the connecting part 85 (FIG. 4) of the bending wire 23a may be provided at a tip end portion of the ring part 83a or may be provided directly on the middle phalange 21b.

Figure 13:
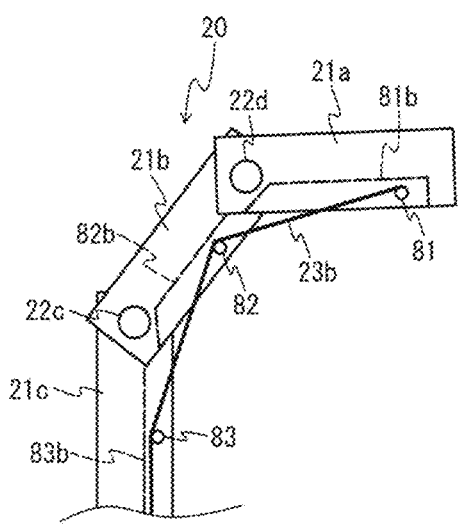
FIG. 13 is a schematic diagram for illustrating a fourth variation.

FIG. 13 is a schematic diagram for illustrating a fourth variation. In FIG. 13, the bending wire 23b and the guide parts 82 and 83 are shown for illustrative purposes. In the fourth variation, the bending wire 23b is disposed along recessed parts 81b, 82b, and 83b formed in the distal phalange 21a, the middle phalange 21b, and the proximal phalange 21c of the finger mechanism 20. Then, the guide part 82 is provided on the recessed part 82b of the middle phalange 21b, and the guide part 83 is provided the on recessed part 83b of the proximal phalange 21c. The guide parts 82 and 83 are pins, for example. The bending wire 23b is in contact with peripheral surfaces of the guide parts 82 and 83. This makes it possible to effectively utilize the limited space of the finger mechanism 20 to place the bending wire 23b.

In the above description, the connecting wires 61 to 68 are connecting members for connecting the bending wires to each other, but the present disclosure is not limited thereto. For example, instead of the connecting wires 61 to 68, a chain or a spring may connect the bending wires to each other.

In the above description, the connecting wires 61 to 68 are provided in the portions of the finger mechanisms 20, 30, 40, and 50, but the present disclosure is not limited thereto. For example, the connecting wires 61 to 68 may connect the bending wires to each other at the driving parts 70b, 70c, 70d, and 70e.

(Effect in the First Embodiment)

The multi-fingered robot 1 of the first embodiment includes the connecting wires 61, 62, 63, and 64 (the connecting wires 65, 66, 67, and 68) providing connections between the bending wires 23a, 33a, 43a, and 53a (the bending wires 23b, 33b, 43b, and 53b) of the finger mechanisms 20, 30, 40, and 50. In the multi-fingered robot 1, when at least two of the finger mechanisms 20, 30, 40, and 50 (in this case, the finger mechanisms 20 and 30) are in bending motion, if the difference between the posture of finger mechanism 20 and that of finger mechanism 30 is greater than a predetermined difference, the driving part 70c that drives the bending wires 33a and 33b of the finger mechanism 30 is made to assist with the bending motion of the finger mechanism 20 via the extended connecting wires 61 and 65.

If there is a large difference between the postures of the two finger mechanisms 20 and 30, it is assumed that one finger mechanism contributes to the operation (for example, the finger mechanism 20 grasps the object M together with the finger mechanism 10) while the other finger mechanism (the finger mechanism 30) does not contribute to the operation. In this instance, the driving part 70c that drives the finger mechanism 30, which does not normally contribute to the operation, assists with the driving of the finger mechanism 20, thereby effectively utilizing the driving part 70c. Further, since one finger mechanism 20 can be driven by the driving parts 70b and 70c, the driving part 70b can be made smaller than when the finger mechanism 20 is driven only by the driving part 70b. Similarly, the driving parts 70c, 70d, and 70e can also be made smaller.

Second Embodiment

A multi-fingered robot 2 of the second embodiment differs from the multi-fingered robot 1 of the first embodiment described above in the arrangement of wires. The configuration other than the wires of the multi-fingered robot 2 is similar to that of the multi-fingered robot 1.

(The Wire Arrangement of the Finger Mechanism)

The wire arrangement of the finger mechanisms 10, 20, 30, 40, and 50 of the multi-fingered robot 2 will be described referring to FIGS. 14 to 17.

Figure 14:
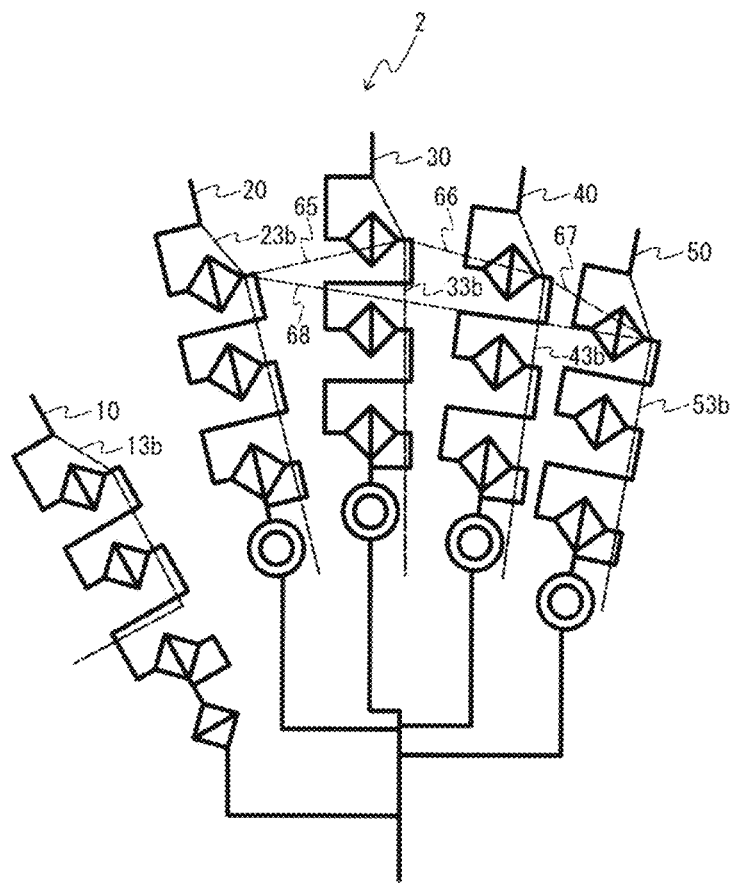
FIG. 14 is a schematic diagram for illustrating an exemplary wire arrangement on the palm side of a multi-fingered robot 2 according to the second embodiment.
Figure 15:
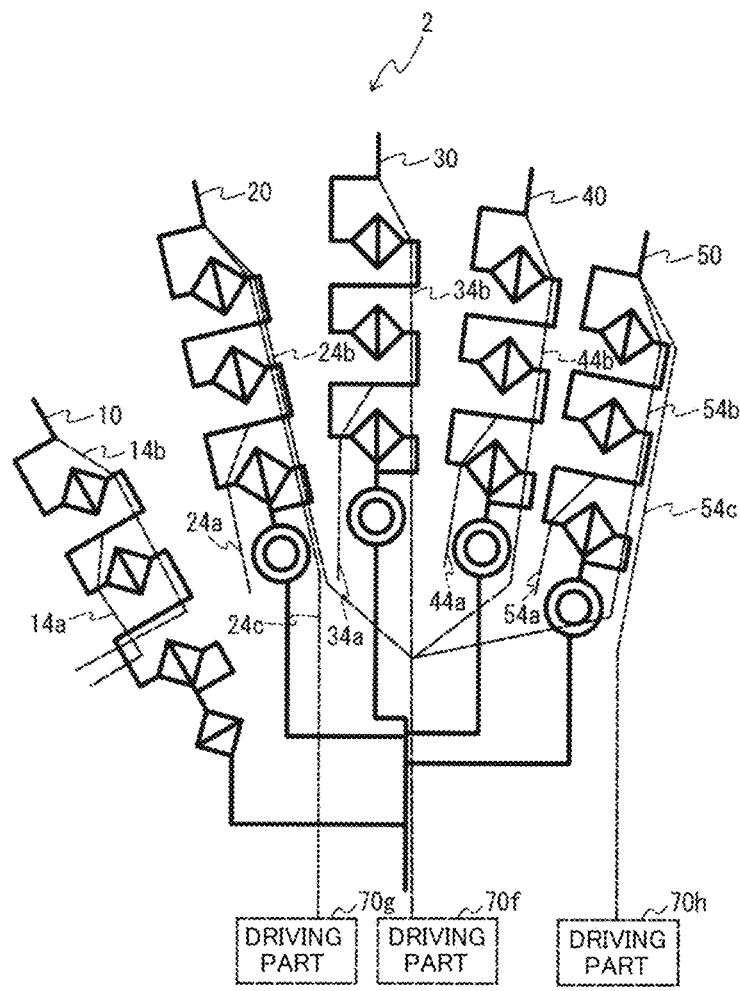
FIG. 15 is a schematic diagram for illustrating an exemplary wire arrangement on the back side of the hand of the multi-fingered robot 2.
Figure 16:
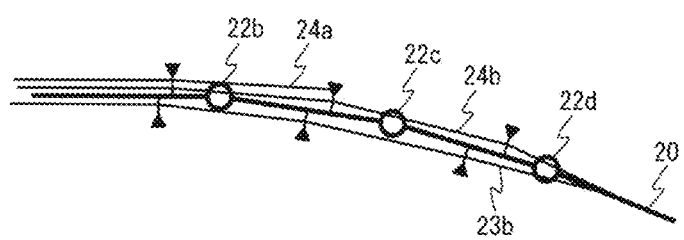
FIG. 16 is a schematic diagram for illustrating the bending wires and the extending wires of the finger mechanism 20.

FIG. 14 is a schematic diagram for illustrating an exemplary wire arrangement on the palm side of the multi-fingered robot 2 according to the second embodiment. FIG. 15 is a schematic diagram for illustrating the exemplary wire arrangement on the back side of the hand of the multi-fingered robot 2. FIG. 16 is a schematic diagram for illustrating the bending wire and the extending wires of the finger mechanism 20. In FIGS. 14 and 15, the wires are shown as broken lines or one-dot chain lines for convenience of explanation.

As shown in FIG. 14, the bending wires 13b, 23b, 33b, 43b, and 53b and the connecting wires 65, 66, 67, and 68 are provided on the palm side of the multi-fingered robot 2. On the back side of the hand of the multi-fingered robot 2, as shown in FIG. 15, the extending wires 14a and 14b, the extending wires 24a, 24b, and 24c, the extending wires 34a and 34b, the extending wires 44a and 44b, and the extending wires 54a, 54b, and 54c are provided.

The bending wire 13b is connected to the distal end portion of the finger mechanism 10, and is driven to bend the finger mechanism 10. The bending wire 23b is connected to the distal end portion of the finger mechanism 20, and is driven to bend the finger mechanism 20. The bending wire 33b is connected to the distal end portion of the finger mechanism 30, and is driven to bend the finger mechanism 30. The bending wire 43b is connected to the distal end portion of the finger mechanism 40, and is driven to bend the finger mechanism 40. As described above, a single bending wire is respectively provided in the finger mechanisms 10, 20, 30, 40, and 50 of the multi-fingered robot 2, and the bending wires 13a, 23a, 33a, 43a, and 53a of the multi-fingered robot 1 are not provided.

The connecting wire 65 connects the bending wire 23b to the bending wire 33b. The connecting wire 66 connects the bending wire 33b to the bending wire 43b. The connecting wire 67 connects the bending wire 43b to the bending wire 53b. The connecting wire 68 connects the bending wire 53b to the bending wire 23b. The connecting wires 65, 66, 67, and 68 have the same function as in the first embodiment, which is distributing the driving force for bending the finger mechanisms 20, 30, 40, and 50.

The extending wires 14a and 14b are driven to extend the finger mechanism 10. The extending wires 24a and 24b are driven to extend the finger mechanism 20. The extending wires 34a and 34b are driven to extend the finger mechanism 30. The extending wires 44a and 44b are driven to extend the finger mechanism 40. The extending wires 54a and 54b are driven to extend the finger mechanism 50. The extending wires 24a, 34a, 44a, and 54a are connected to different driving parts, respectively. The extending wires 24b, 34b, 44b, and 54b are connected to a single driving part.

The extending wire 24c is provided on the finger mechanism 20, and is driven to extend the finger mechanism 20.

The extending wire 54c is provided on the finger mechanism 50, and is driven to extend the finger mechanism 50. The extending wire 24c and the extending wire 54c are connected to different driving parts, respectively.

The finger mechanisms 20, 30, 40, and 50 are provided with opening and closing wires that bring the finger mechanisms 20, 30, 40, and 50 closer or further away from each other (that is, opening and closing). Since the opening and closing wires of the finger mechanisms 20, 30, 40, and 50 have the same configuration, the following describes the opening and closing wires provided in the finger mechanism 20 and the finger mechanism 30 as an example, while referring to FIG. 17.

Figure 17:
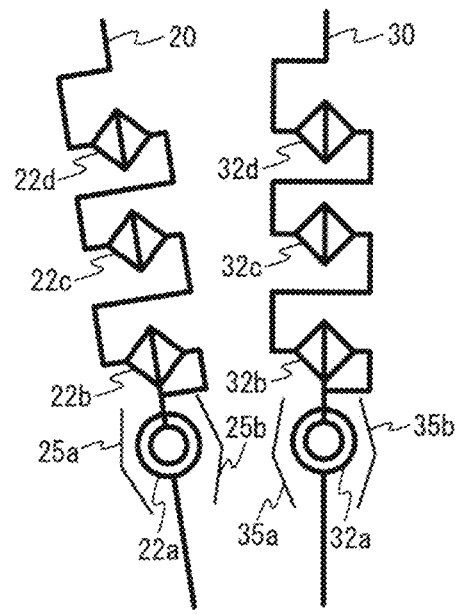
FIG. 17 is a schematic diagram for illustrating opening and closing wires.

FIG. 17 is a schematic diagram for illustrating the opening and closing wires. As shown in FIG. 17, opening and closing wires 25a and 25b forming a pair are provided on respective sides of the finger mechanism 20, and opening and closing wires 35a and 35b forming a pair are provided on respective sides of the finger mechanism 30. The opening and closing wires 25a and 25b and the opening and closing wires 35a and 35b correspond to fifth wires for moving the finger mechanisms 20 and 30 in the left-right direction, respectively.

For example, the opening and closing wire 25a is connected to the left side surface of the finger mechanism 20 and is a wire for moving the finger mechanism 20 to the left by driving. For example, the opening and closing wire 25b is connected to the right side surface of the finger mechanism 20 and is a wire for moving the finger mechanism 20 to the right by driving. The opening and closing wires 35a and 35b are connected to the finger mechanism 30 in a similar manner as the opening and closing wires 25a and 25b, to move the finger mechanism 30 in the left-right direction. Then, the opening and closing wires 25b and the opening and closing wire 35a are driven to bring the finger mechanism 20 and 30 closer together (close). On the other hand, the opening and closing wire 25a and the opening and closing wire 35b are driven to bring the finger mechanism 20 and the finger mechanism 30 away from each other (open).

In the first embodiment, the controller 80 drives the two bending wires 23a and 23b to bend the fingers 20. In contrast, in the second embodiment, the controller 80 uses the bending wire 23b and the opening and closing wires 25a and 25b to bend the finger mechanism 20. For example, the controller 80 simultaneously drives the opening and closing wires 25a and 25b of the finger mechanism 20 and drives the bending wire 23b of the finger mechanism 20 to bend the finger mechanism 20. This makes it easier to properly bend the finger mechanism 20 by supporting the finger mechanism 20 with the opening and closing wires 25a and 25b, even if there is only a single bending wire 23b. Similarly, the controller 80 uses the bending wires 33b, 43b, and 53b and the opening and closing wires 35a, 35b, 45a, 45b, 55a, and 55b to bend the finger mechanisms 30, 40, and 50.

Further, the controller 80 drives the extending wire 24b of the finger mechanism 20 and drives one of the opening and closing wires 25a and 25b of the finger mechanism 20 to move the finger mechanism 20 in the left-right direction. For example, the controller 80 drives the extending wire 24b and the opening and closing wire 25a to move the finger mechanism 20 to the left, and drives the extending wire 24b and the opening and closing wire 25b to move the finger mechanism 20 to the right. Since the extending wire 24b supports the finger mechanism 20, the finger mechanism 20 is easily moved in the left-right direction.

Although the opening and closing wires are not described in the first embodiment, the multi-fingered robot 1 of the first embodiment is moved in the left-right direction by pairs of opening and closing wires respectively provided in the finger mechanisms 20, 30, 40, and 50.

(Effect in the Second Embodiment)

In the second embodiment, the multi-fingered robot 2 also includes the connecting wires 65, 66, 67, and 68 that connect the bending wires 23b, 33b, 43b, and 53b of the finger mechanisms 20, 30, 40, and 50 to each other. Then, the controller 80 transmits the driving force of the driving part 70c of the finger mechanism 30 to the finger mechanism 20 via the connecting wire 65, for example, when bending the finger mechanism 20 which contributes to the operation and the finger mechanism 30 which does not contribute to the operation. This allows effective use of the driving part 70c which does not contribute to the operation.

Further, in the second embodiment, the finger mechanisms 20, 30, 40, and 50 are made to bend by driving a single bending wire and a pair of opening and closing wires. This allows the finger mechanisms 20, 30, 40, and 50 to be bent appropriately while reducing the number of bending wires.

Third Embodiment

The configuration of the finger mechanism of the multi-fingered robot according to the third embodiment will be described referring to FIGS. 18 and 19. In finger mechanisms 120 and 130 according to the third embodiment, an arrangement order of the four joint parts and an arrangement state of the opening and closing wires are different from those of the configurations of the finger mechanisms 20 and 30 shown in FIG. 17 described above.

Figure 18:
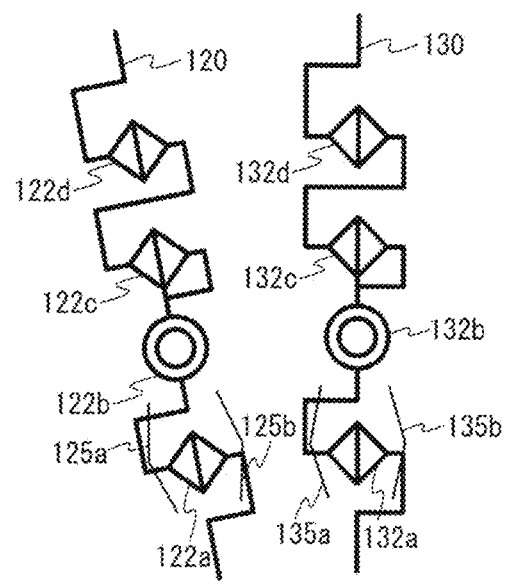
FIG. 18 is a schematic diagram for illustrating finger mechanisms 120 and 130 according to the third embodiment.

FIG. 18 is a schematic diagram for illustrating the finger mechanisms 120 and 130 according to the third embodiment. FIG. 19 is a schematic diagram for illustrating the arrangement of a bending wire 123b and opening and closing wires 125a and 125b in the finger mechanism 120.

As shown in FIG. 18, the finger mechanism 120 includes four joint parts 122a, 122b, 122c, and 122d, and the finger mechanism 130 also includes four joint parts 132a, 132b, 132c, and 132d. The four joint parts 122a, 122b, 122c, and 122d consist of the joint parts 22a, 22b, 22c, and 22d shown in FIG. 17, with the positions of the joint parts 22a and 22b interchanged. The joint 122b is a joint that moves the finger mechanism 120 in the left-right direction. Similarly, the four joint parts 132a, 132b, 132c, and 132d also consist of the joint parts 32a, 32b, 32c, and 32d shown in FIG. 17, with the positions of the joint parts 32a and 32b interchanged.

Figure 19:
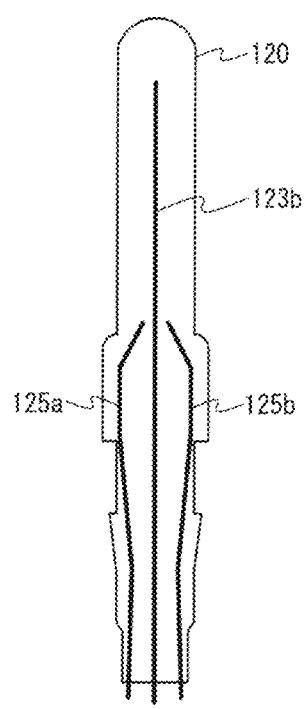
FIG. 19 is a schematic diagram for illustrating the arrangement of a bending wire 123b and opening and closing wires 125a and 125b in the finger mechanism 120.

The four joint parts 122a, 122b, 122c, and 122d of the finger mechanism 120 are provided with a single bending wire 123b and two opening and closing wires 125a and 125b as shown in FIG. 19. The finger mechanism 120 also includes an extending wire for extending the finger mechanism 120, not shown in FIG. 18 or FIG. 19. It should be noted that the arrangement of wires in the finger mechanism 130 is the same as in the finger mechanism 120, and therefore a detailed description thereof is omitted.

As shown in FIG. 19, the bending wire 123b is provided longitudinally along the center of the finger mechanism 120 (specifically, from the joint part 122a serving as a proximal portion to the joint part 122d serving as a fingertip of the finger mechanism 120). The bending wire 123b is connected to the joint 122d, and is driven to bend the finger mechanism 120.

The opening and closing wires 125a and 125b are arranged on respective sides of the bending wire 123b as shown in FIG. 19. The opening and closing wires 125a and 125b here are provided approximately parallel to the bending wire 123b. The opening and closing wires 125a and 125b are driven to move the finger mechanism 120 in the left-right direction. For example, one of the opening and closing wires 125a and 125b is driven to move the finger mechanism 120 toward or away from the finger mechanism 130. As shown in FIG. 18, the opening and closing wires 125a and 125b are provided from the proximal portion to the joint part 122b.

Also in the variation, when the bending wire 123b is driven, the opening and closing wires 125a and 125b are driven together to bend the finger mechanism 120. That is, the bending wire 123b bends the finger mechanism 120 while the opening and closing wires 125a and 125b support the finger mechanism 120. As described above, since the opening and closing wires 125a and 125b are provided up to the joint part 122b, the bending operation of the finger mechanism 120 is more easily stabilized even if there is only a single bending wire 123b. The opening and closing wires 135a and 135b of the finger mechanism 130 are also driven in the same manner, so that the bending operation of the finger mechanism 130 is easily stabilized.

It should be noted that the configurations of the finger mechanism 120 following the index finger and the finger mechanism 130 following the middle finger of the multi-fingered robot have been described above, but the finger mechanism following the ring finger and the finger mechanism following the little finger have similar configurations. This will allow the entire multi-fingered robot to perform optimal movements.

Further, in the above description, the opening and closing wires 125a and 125b are arranged so as to be substantially parallel to the bending wire 123b, but the present disclosure is not limited thereto. For example, the opening and closing wires 125a and 125b may be arranged so as to intersect with each other.

Figure 20:
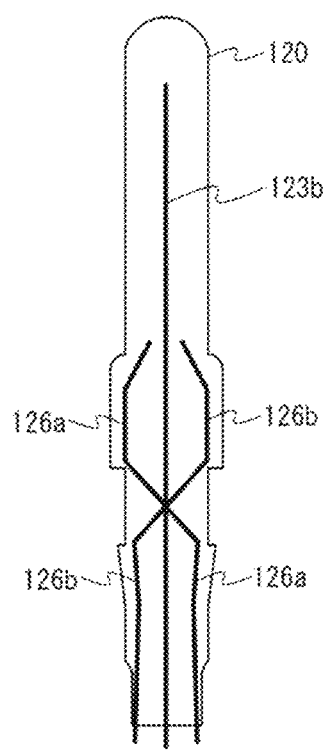
FIG. 20 is a schematic diagram for illustrating a variation of the finger mechanism 120.

FIG. 20 is a schematic diagram for illustrating a variation of the finger mechanism 120. The finger mechanism 120 according to the variation includes opening and closing wires 126a and 126b arranged so as to intersect with each other instead of the opening and closing wires 125a and 125b. The opening and closing wires 126a and 126b are arranged in an X-shape, as shown in FIG. 20. When the opening and closing wires 126a and 126b are arranged so as to intersect with each other in this manner, the movement of the finger mechanism 120 in the left-right direction is stabilized. It should be noted that the opening and closing wires 126a and 126b may be displaced in the height direction so that they do not contact each other.

The present disclosure is explained on the basis of the exemplary embodiments. The technical scope of the present disclosure is not limited to the scope explained in the above embodiments and it is possible to make various changes and modifications within the scope of the disclosure. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

What is claimed is:

1. A robot hand device comprising:
    a plurality of finger mechanisms that correspond to an index finger, a middle finger, a ring finger, and a little finger of a human hand, each of which has a first wire for driving, the plurality of finger mechanisms comprising at least a first finger mechanism and a second finger mechanism;
    a plurality of driving parts for bending that independently drives the first wire of each finger mechanism so as to bend each of the finger mechanisms, the plurality of driving parts for bending comprising at least a first driving part for bending which drives the first wire of the first finger mechanism and a second driving part for bending which drives the first wire of the second finger mechanism;
    a connecting member that provides a connection between the first wire of the first finger mechanism and the first wire of the second finger mechanism, the connecting member is in a slack state when the first finger mechanism and the second finger mechanism are not bent; and
    a driving controller that controls driving of the first wire of each of the finger mechanisms by the driving parts for bending, wherein
    the driving controller causes the second driving part for bending to assist with the bending operation of the first finger mechanism via the connecting member if the connecting member is in a taut state when at least the first finger mechanism and the second finger mechanism of the plurality of finger mechanisms bend.

2. The robot hand device according to claim 1, wherein the second finger mechanism is a finger mechanism adjacent to the first finger mechanism of the plurality of finger mechanisms in a direction from the index finger toward the little finger.

3. The robot hand device according to claim 1, further comprising:
    a second wire that is provided on each of the plurality of finger mechanisms and extends each finger mechanism; and
    a first driving part for extending that drives the second wire so as to extend each of the finger mechanisms.

4. The robot hand device according to claim 3, wherein the first driving part for extending drives the second wire of each finger mechanism together.

5. The robot hand device according to claim 4, further comprising:
    a third wire that is provided separately from the second wire m the finger mechanism corresponding to the index finger and extends the finger mechanism; and
    a second driving part for extending that drives the third wire so as to extend the finger mechanism corresponding to the index finger independently.

6. The robot hand device according to claim 5, further comprising:
    a fourth wire that is provided separately from the second wire in the finger mechanism corresponding to the little finger and extends the finger mechanism; and
    a third driving part for extending that drives the fourth wire so as to extend the finger mechanism corresponding to the little finger independently.

7. The robot hand device according to claim 6, wherein the driving controller causes the second driving part for extending to drive the third wire and causes the third driving part for extending to drive the fourth wire when the driving controller causes the first driving part for extending to drive the second wire.

8. The robot hand device according to claim 1, wherein the first wire of each finger mechanism including a plurality of joint parts includes a) a first proximal side wire for bending a proximal side joint and b) a first finger-tip side wire for bending a finger-tip side joint, and the connecting member includes a) a proximal side connecting member providing a connection between the first proximal side wires of two finger mechanisms and b) a fingertip side connecting member providing a connection between the first fingertip side wires of the two finger mechanisms.

9. The robot hand device according to claim 1, wherein the first wire is connected to a fingertip portion of each finger mechanism and is a single wire for bending a plurality of joint parts of each finger mechanism, the robot hand device further comprises a pair of fifth wires that are provided on respective sides of each finger mechanism and move the finger mechanism in the left-right direction, and the driving controller drives the pair of fifth wires and the first wire of one finger mechanism to bend the one finger mechanism.

10. The robot hand device according to claim 9, wherein the driving controller simultaneously drives the pair of fifth wires of the one finger mechanism and drives the first wire of the one finger mechanism to bend the one finger mechanism.

11. The robot hand device according to claim 9, further comprising:

a second wire that is provided in each of the plurality of finger mechanisms and connected to a finger-tip portion of each finger mechanism to extend the finger mechanism, wherein the driving controller drives the second wire of one finger mechanism and drives either of the pair of fifth wires of the one finger mechanism to move the one finger mechanism in the left-right direction.

12. A robot hand device comprising:

a plurality of finger mechanisms corresponding to an index finger, a middle finger, a ring finger, and a little finger of a human hand, each of which has a first wire for driving;

a plurality of driving parts for bending that independently drives the first wire of each finger mechanism so as to bend each of the finger mechanisms;

a second wire that is provided in each of the plurality of finger mechanisms and extends each finger mechanism; and a first driving part for extending that drives the second wire so as to extend each of the finger mechanisms, wherein the first driving part for extending drives the second wire of each finger mechanism together.

13. The robot hand device according to claim 12, further comprising:

a third wire that is provided separately from the second wire in the finger mechanism corresponding to the index finger and extends the finger mechanism; and a second driving part for extending that drives the third wire so as to extend the finger mechanism corresponding to the index finger independently.

14. The robot hand device according to claim 13, further comprising:

a fourth wire that is provided separately from the second wire in the finger mechanism corresponding to the little finger and extends the finger mechanism; and a third driving part for extending that drives the fourth wire so as to extend the finger mechanism corresponding to the little finger independently.

15. The robot hand device according to claim 14, further comprising:

a driving controller that causes the second driving part for extending to drive the third wire and causes the third driving part for extending to drive the fourth wire when the driving controller causes the first driving part for extending to drive the second wire.

\* \* \* \* \*